US008999602B2

(12) United States Patent
Gronwald et al.

(10) Patent No.: US 8,999,602 B2
(45) Date of Patent: Apr. 7, 2015

(54) SEPARATORS FOR ELECTROCHEMICAL CELLS COMPRISING POLYMER PARTICLES

(71) Applicants: BASF SE, Ludwigshafen (DE); Carl Freudenberg KG, Weinheim (DE)

(72) Inventors: Oliver Gronwald, Frankfurt (DE); Klaus Leitner, Ludwigshafen (DE); Nicole Janssen, Bermersheim (DE); Christoph J. Weber, Laudenbach (DE); Michael Roth, Mainz (DE); Gunter Hauber, Dossenheim (DE); Sandra Falusi, Mannheim (DE); Sigrid Geiger, Birkenau (DE); Margitta Berg, Birkenau (DE)

(73) Assignees: BASF SE, Ludwigshafen (DE); Carl Freudenberg KG, Weinheim (DE)

( * ) Notice: Subject to any disclaimer, the term of this patent is extended or adjusted under 35 U.S.C. 154(b) by 119 days.

(21) Appl. No.: 13/775,804

(22) Filed: Feb. 25, 2013

(65) Prior Publication Data

US 2013/0224631 A1 Aug. 29, 2013

Related U.S. Application Data

(60) Provisional application No. 61/603,376, filed on Feb. 27, 2012.

(51) Int. Cl.
| | |
|---|---|
| *H01M 2/14* | (2006.01) |
| *H01M 2/16* | (2006.01) |
| *H01G 9/02* | (2006.01) |
| *H01G 11/52* | (2013.01) |
| *H01M 8/02* | (2006.01) |
| *H01M 10/0525* | (2010.01) |

(52) U.S. Cl.
CPC ............ *H01M 2/162* (2013.01); *H01M 8/0239* (2013.01); *H01G 9/02* (2013.01); *H01G 11/52* (2013.01); *Y02E 60/13* (2013.01); *H01M 2/1653* (2013.01); *H01M 2/1666* (2013.01); *H01M 10/0525* (2013.01)

(58) Field of Classification Search
CPC . H01M 2/162; H01M 2/1653; H01M 2/1666; H01M 8/0239
USPC .......................................... 429/144, 145, 509
See application file for complete search history.

(56) References Cited

U.S. PATENT DOCUMENTS

| | | | |
|---|---|---|---|
| 5,456,843 | A | 10/1995 | Koenhen |
| 2010/0196688 | A1 | 8/2010 | Kritzer et al. |
| 2010/0206804 | A1 | 8/2010 | Weber et al. |
| 2011/0081601 | A1* | 4/2011 | Weber et al. .................. 429/494 |
| 2012/0028103 | A1 | 2/2012 | Weber et al. |
| 2012/0251884 | A1 | 10/2012 | Leitner et al. |
| 2013/0040183 | A1 | 2/2013 | Leitner et al. |

FOREIGN PATENT DOCUMENTS

| | | |
|---|---|---|
| DE | 694 19 376 T2 | 11/1999 |
| EP | 2 186 149 B1 | 8/2011 |
| JP | 2010-73537 A | 4/2010 |
| WO | WO 03/072231 A2 | 9/2003 |
| WO | WO 2004/021475 A1 | 3/2004 |
| WO | WO 2006/068428 A1 | 6/2006 |
| WO | WO 2007/028662 A1 | 3/2007 |
| WO | WO 2009103537 A1 * | 8/2009 |

OTHER PUBLICATIONS

U.S. Appl. No. 13/705,592, filed Dec. 5, 2012, Garsuch, et al.
U.S. Appl. No. 13/705,599, filed Dec. 5, 2012, Gronwald, et al.
U.S. Appl. No. 13/748,243, filed Jan. 23, 2013, Janssen, et al.
Sheng Shui Zhang, "A review on the separators of liquid electrolyte Li-ion batteries", Journal of Power Sources, vol. 164, 2007, pp. 351-364.
International Search Report issued Jul. 10, 2013 in PCT/EP2013/053709 with English Translation of Category of Cited Documents.
U.S. Appl. No. 13/859,948, filed Apr. 10, 2013, Leitner, et al.

* cited by examiner

*Primary Examiner* — Stewart Fraser
(74) *Attorney, Agent, or Firm* — Oblon, McClelland, Maier & Neustadt, L.L.P.

(57) ABSTRACT

The present invention relates to separators for electrochemical cells comprising
(A) at least one layer comprising
  (a) crosslinked polyvinylpyrrolidone in the form of particles,
  (b) at least one binder, and
  (c) optionally a base structure,
where the mass ratio of the crosslinked polyvinylpyrrolidone in the form of particles (a) to the sum of the mass of the binders (b) in the layer (A) has a value in the range from 99.9:0.1 to 50:50.
The present invention further relates to the use of inventive separators and to apparatuses, especially electrochemical cells, comprising inventive separators.

17 Claims, No Drawings

SEPARATORS FOR ELECTROCHEMICAL CELLS COMPRISING POLYMER PARTICLES

The present invention relates to separators for electrochemical cells comprising
(A) at least one layer comprising
   (a) crosslinked polyvinylpyrrolidone in the form of particles,
   (b) at least one binder, and
   (c) optionally a base structure,
where the mass ratio of the crosslinked polyvinylpyrrolidone in the form of particles (a) to the sum of the mass of the binders (b) in the layer (A) has a value in the range from 99.9:0.1 to 50:50.

The present invention further relates to the use of inventive separators and to apparatuses, especially electrochemical cells, comprising inventive separators.

Storing energy has long been a subject of growing interest. Electrochemical cells, for example batteries or accumulators, can serve to store electrical energy. As of recently, what are called lithium ion batteries have attracted particular interest. They are superior to the conventional batteries in several technical aspects. For instance, they can be used to generate voltages unobtainable with batteries based on aqueous electrolytes.

In electrochemical cells, the positively and negatively charged electrode compositions, for prevention of internal discharge, are separated mechanically from one another by electrically nonconductive layers, called separators. By virtue of their porous structure, these separators enable the transport of ionic charges as a basic prerequisite for the constant drawing of current during battery operation. Fundamental requirements on separators are chemical and electrochemical stability toward the active electrode compositions and the electrolyte. In addition, there has to be high mechanical durability with respect to the tensile forces which occur during the battery cell production process. At the structural level, high porosity for absorption of the electrolyte is required to ensure high ion conductivity. At the same time, pore size and the structure of the channels must effectively suppress the growth of metal dendrites to prevent a short circuit, as described in Journal Power Sources 2007, 164, 351-364.

Separators as microporous layers frequently consist either of a polymer membrane or a nonwoven fabric.

At present, polymer membranes based on polyethylene and polypropylene are typically being used as separators in electrochemical cells, but these membranes exhibit inadequate stability at elevated temperatures of 130 to 150° C.

An alternative to the frequently used polyolefin separators is separators based on nonwoven fabrics filled with ceramic particles and additionally fixed with an inorganic binder composed of oxides of the elements silicon, aluminum and/or zirconium, as described in DE10255122 A1, DE10238941 A1, DE10208280 A1, DE10208277 A1 and WO 2005/038959 A1. However, the nonwoven fabrics filled with ceramic particles have increased basis weights and greater thicknesses compared to the unfilled nonwoven fabrics.

WO 2009/033627 discloses a ply which can be used as separator for lithium ion batteries. It comprises a nonwoven fabric and particles which are intercalated into the nonwoven fabric and consist of organic polymers and possibly partly of inorganic material. Such separators are supposed to prevent short circuits caused by metal dendrites. However, WO 2009/033627 does not disclose any long-term cycling experiments.

WO 2009/103537 discloses a ply with a base structure having pores, and the ply further comprises a binder which has been crosslinked. In a preferred embodiment, the base structure has been at least partly filled with particles. The plies disclosed can be used as separators in batteries. In WO 2009/103537, however, no electrochemical cells comprising the plies described are produced or examined.

WO 2010/118822 discloses an unsymmetric battery separator having a cathode side and an anode side which differ with regard to their respective material consistencies.

The separators known from the literature still have shortcomings with regard to one or more of the properties desired for the separators, such as low thickness, low basis weight, good mechanical stability during processing, for example high flexibility or low abrasion, or in battery operation with respect to metal dendrite growth, good thermal stability, low shrinkage characteristics, high porosity, good ion conductivity and good wettability with the electrolyte fluids. Ultimately, some of the shortcomings of the separators are responsible for a reduced lifetime of the electrochemical cells comprising them. In addition, separators must in principle be not just mechanically stable but also chemically stable with respect to the cathode materials, the anode materials and the electrolytes.

It was thus an object of the present invention to provide an inexpensive separator for a long-life electrochemical cell, which has advantages over one or more properties of a known separator, especially a separator which, coupled with low thickness, exhibits high porosity, low shrinkage and high thermal stability and is usable in electrochemical cells with high power and energy density over a wide temperature range with high safety demands.

This object is achieved by a separator defined at the outset for an electrochemical cell, which comprises
(A) at least one layer comprising
   (a) crosslinked polyvinylpyrrolidone in the form of particles,
   (b) at least one binder, and
   (c) optionally a base structure,
where the mass ratio of the crosslinked polyvinylpyrrolidone in the form of particles (a) to the sum of the mass of the binders (b) in the layer (A) has a value in the range from 99.9:0.1 to 50:50.

The separator which is suitable for an electrochemical cell, especially a rechargeable electrochemical cell, comprises at least one layer, also called layer (A) for short, which comprises (a) crosslinked polyvinylpyrrolidone in the form of particles, also called particles of crosslinked polyvinylpyrrolidone (a) or particles (a) for short, (b) at least one binder, also called binder (b) for short, and (c) optionally a base structure, also called base structure (c) for short, where the mass ratio of the crosslinked polyvinylpyrrolidone in the form of particles (a) to the sum of the mass of the binders (b) in the layer (A) has a value in the range from 99.9:0.1 to 50:50, preferably in the range from 99:1 to 80:20, more preferably in the range from 98:2 to 90:10, especially in the range from 97:3 to 93:7.

Crosslinked polyvinylpyrrolidone in the form of particles is known in principle. Crosslinked polyvinylpyrrolidone, which is also referred to as crospovidone, is a water-insoluble but swellable polymer of vinylpyrrolidone, which can be prepared, for example, in what is called a popcorn polymerization, as described, for example, in U.S. Pat. No. 3,933,766 or WO 2007/071580, page 2 line 21 to page 5 line 33. The crosslinked polyvinylpyrrolidone consists typically to an extent of more than 80% by weight, preferably to an extent of more than 90% by weight and especially more than 96% by weight of the monomer vinylpyrrolidone. Either by virtue of the preparation process itself or by virtue of comminution of the polymer particles obtained in the preparation of crosslinked polyvinylpyrrolidone and suitable sifting processes, it is possible to produce powders of crosslinked polyvinylpyrrolidone with various average particle sizes within a wide range. For pharmaceutical applications, for example as tablet disintegrants, product types with different ranges of mean particle size are commercially available, for example under the Kollidon® product name from BASF SE. The crosslinked polyvinylpyrrolidone in the form of particles (a) preferably has, in layer (A), a mean particle size in the range from 0.01 to 50 µm, preferably in the range from 0.01 to 10 µm, especially in the range from 0.1 to 5 µm. In a preferred embodiment of the present invention, in the inventive separator for an electrochemical cell, the crosslinked polyvinylpyrrolidone present in layer (A) in the form of particles (a) has a mean particle size in the range from 0.1 to 5 µm.

The particle size distribution was determined by means of laser diffraction technology in powder form to DIN ISO 13320-1 with a Mastersizer from Malvern Instruments GmbH, Herrenberg, Germany. The crucial value for the mean particle size is what is called the d90 value. The d90 value of the volume-weighted distribution is that particle size for which 90% of the particle volume of particles are smaller than or equal to the d90 value.

The particles of crosslinked polyvinylpyrrolidone (a) may have different shapes according to the production process. In principle, regularly shaped particles, for example spherical particles, or irregularly shaped particles are conceivable. Irregularly shaped particles of crosslinked polyvinylpyrrolidone can be obtained, for example, by the above-described popcorn polymerization. The particles which are preferably of irregular shape in the context of the present invention are multifaceted bodies which have both outwardly curved and inwardly curved outer face components. To illustrate the appearance of the particles of crosslinked polyvinylpyrrolidone (a) having an irregular shape, reference is made to the figures from V. Buehler, "Polyvinylpyrrolidone Excipients for Pharmaceuticals", p. 130, Springer Verlag Berlin Heidelberg, 2005.

In a further embodiment of the present invention, in the inventive separator for an electrochemical cell, the particles of crosslinked polyvinylpyrrolidone (a) present in layer (A) have an irregular shape.

In a particularly preferred embodiment of the present invention, in the inventive separator for an electrochemical cell, the crosslinked polyvinylpyrrolidone present in layer (A) in the form of particles (a) has a mean particle size in the range from 0.1 to 5 µm and the particles have an irregular shape.

The proportion by weight of the crosslinked polyvinylpyrrolidone in the form of particles (a) in the total mass of layer (A) may be up to 99.9% by weight. The proportion by weight of the crosslinked polyvinylpyrrolidone in the form of particles (a) in the total mass of layer (C) is preferably at least 5% by weight, the proportion by weight more preferably being from 20 to 80% by weight, especially from 30 to 60% by weight.

Layer (A) of the inventive separator for an electrochemical cell comprises at least one binder (b), for example one or more organic polymers. Suitable binders are, for example, organic (co)polymers, as detailed, for example, in WO 2009/033627 at page 8 line 7 to page 12 line 11. The use of a binder composed of organic polymers allows production of a separator with adequate mechanical flexibility.

Suitable (co)polymers, i.e. homopolymers or copolymers, can be selected, for example, from (co)polymers obtainable by anionic, catalytic or free-radical (co)polymerization, especially from polyethylene, polyacrylonitrile, polybutadiene, polystyrene, and copolymers of at least two comonomers selected from ethylene, propylene, styrene, (meth)acrylonitrile and 1,3-butadiene, especially styrene-butadiene copolymers. Polypropylene is also suitable. Polyisoprene and polyacrylates are additionally suitable. Particular preference is given to polyacrylonitrile. Polyacrylonitrile is understood in the context of the present invention to mean not only polyacrylonitrile homopolymers, but also copolymers of acrylonitrile with 1,3-butadiene or styrene. Preference is given to polyacrylonitrile homopolymers.

In the context of the present invention, polyethylene is understood to mean not only homopolyethylene but also copolymers of ethylene which comprise at least 50 mol % of ethylene in copolymerized form and up to 50 mol % of at least one further comonomer, for example α-olefins such as propylene, butylene (1-butene), 1-hexene, 1-octene, 1-decene, 1-dodecene, 1-pentene, and also isobutene, vinylaromatics, for example styrene, and also (meth)acrylic acid, vinyl acetate, vinyl propionate, $C_1$-$C_{10}$-alkyl esters of (meth) acrylic acid, especially methyl acrylate, methyl methacrylate, ethyl acrylate, ethyl methacrylate, n-butyl acrylate, 2-ethylhexyl acrylate, n-butyl methacrylate, 2-ethylhexyl methacrylate, and also maleic acid, maleic anhydride and itaconic anhydride. Polyethylene may be HDPE or LDPE.

In the context of the present invention, polypropylene is understood to mean not only homopolypropylene but also copolymers of propylene which comprise at least 50 mol % of propylene in copolymerized form and up to 50 mol % of at least one further comonomer, for example ethylene and α-olefins such as butylene, 1-hexene, 1-octene, 1-decene, 1-dodecene and 1-pentene. Polypropylene is preferably isotactic or essentially isotactic polypropylene.

In the context of the present invention, polystyrene is understood to mean not only homopolymers of styrene but also copolymers with acrylonitrile, 1,3-butadiene, (meth) acrylic acid, $C_1$-$C_{10}$-alkyl esters of (meth)acrylic acid, divinylbenzene, especially 1,3-divinylbenzene, 1,2-diphenylethylene and α-methylstyrene.

Another preferred binder is polybutadiene.

Other suitable binders are selected from polyethylene oxide (PEO), cellulose, carboxymethylcellulose, polyvinylpyrrolidone, polyimides and polyvinyl alcohol.

In one embodiment of the present invention, binders are selected from those (co)polymers which have a mean molecular weight $M_w$ in the range from 50 000 to 1 000 000 g/mol, preferably to 500 000 g/mol.

Binders may be crosslinked or uncrosslinked (co)polymers.

In a preferred embodiment of the present invention, binders are selected from halogenated (co)polymers, especially from fluorinated (co)polymers. Halogenated or fluorinated (co) polymers are understood to mean those (co)polymers comprising, in copolymerized form, at least one (co)monomer having at least one halogen atom or at least one fluorine atom per molecule, preferably at least two halogen atoms or at least two fluorine atoms per molecule.

Examples are polyvinyl chloride, polyvinylidene chloride, polytetrafluoroethylene, polyvinylidene fluoride (PVdF), tetrafluoroethylene-hexafluoropropylene copolymers, vinylidene fluoride-hexafluoropropylene copolymers (PVdF-HFP), vinylidene fluoride-tetrafluoroethylene copolymers, perfluoroalkyl vinyl ether copolymers, ethylene-tetrafluoroethylene copolymers, vinylidene fluoride-chlorotrifluoroethylene copolymers and ethylene-chlorofluoroethylene copolymers.

Suitable binders are especially polyvinyl alcohol, water-soluble polyvinylpyrrolidone, styrene-butadiene rubber, polyacrylonitrile, carboxymethylcellulose and fluorinated (co)polymers, especially styrene-butadiene rubber.

In a further embodiment of the present invention, in the inventive separator for an electrochemical cell, the binder (b) present in layer (A) is selected from the group of polymers consisting of polyvinyl alcohol, water-soluble polyvinylpyrrolidone, styrene-butadiene rubber, polyacrylonitrile, carboxymethylcellulose and fluorinated (co)polymers, especially water-soluble polyvinylpyrrolidone and styrene-butadiene rubber.

Layer (A) has the further feature that the mass ratio of the crosslinked polyvinylpyrrolidone in the form of particles (a) to the sum of the mass of the binders (b) in layer (A) has a value in the range from 99.9:0.1 to 50:50, preferably in the range from 99:1 to 80:20, more preferably in the range from 98:2 to 90:10, especially in the range from 97:3 to 93:7.

Layer (A) may comprise, in addition to the crosslinked polyvinylpyrrolidone in the form of particles (a) and the at least one binder (b), a base structure as a further constituent, for example a base structure (c) consisting of fibers, such as a woven fabric, a felt, a nonwoven fabric, a paper or a mat, especially a nonwoven fabric, the base structure (c) ensuring improved stability of layer (A), without impairing the necessary porosity and ion permeability thereof. Alternatively or additionally, layer (A) as the base structure may also comprise at least one porous polymer layer, for example a polyolefin membrane, especially a polyethylene or polypropylene membrane. Polyolefin membranes may in turn be formed from one or more layers. Porous polyolefin membranes or else nonwoven fabrics themselves may, as explained at the outset, fulfill the function of a separator alone. In principle, layer (A) may additionally also comprise inorganic particles, as specified, for example, in WO 2009/033627, page 18 lines 4 to 8. The inventive separator preferably comprises less than 5% by weight and especially less than 1% by weight of inorganic particles, based on the total mass of the separator. In addition, layer (A) may in principle also comprise particles of further organic polymers, as specified, for example, in WO 2009/033627, page 12 line 23 to page 17 line 18. The inventive separator preferably comprises, aside from the particles of crosslinked polyvinylpyrrolidone (a), less than 50% by weight, more preferably less than 20% by weight, even more preferably less than 5% by weight and especially less than 1% by weight of particles of further organic polymers, based on the total mass of particles present in layer (A).

In a further embodiment of the present invention, in the inventive separator for an electrochemical cell, layer (A) further comprises a base structure (c) consisting of fibers, and layer (A) more particularly further comprises a base structure (c) composed of nonwoven fabric.

The base structure (c) composed of nonwoven fabric can be produced from inorganic or organic materials, preferably organic materials.

Examples of organic nonwoven fabrics are polyester nonwovens, especially polyethylene terephthalate nonwovens (PET nonwovens), polybutylene terephthalate nonwovens (PBT nonwovens), polyimide nonwovens, polyethylene and polypropylene nonwovens, PVdF nonwovens and PTFE nonwovens.

Examples of inorganic nonwoven fabrics are glass fiber nonwovens and ceramic fiber nonwovens.

In a further embodiment of the present invention, in the inventive separator for an electrochemical cell, the base structure (c) consists of fibers and has first pores formed by the fibers, the base structure (c) being filled at least partly with particles of crosslinked polyvinylpyrrolidone (a) and the particles of crosslinked polyvinylpyrrolidone (a) at least partly filling the first pores and forming regions filled with particles of crosslinked polyvinylpyrrolidone (a), the particles of crosslinked polyvinylpyrrolidone (a) forming second pores in the filled regions, the mean diameter of the particles of crosslinked polyvinylpyrrolidone (a) being greater than the mean pore size of the majority of second pores.

WO 2009/033514, page 5 line 16 to page 6 line 12, gives a more detailed description of the structure of a layer comprising a nonwoven fabric and particles, especially spherical particles. The particles of crosslinked polyvinylpyrrolidone (a) having an irregular shape may fill the pores in the base structure (c) composed of nonwoven fabric to form a high porosity and, at the same time, may create a labyrinth-like pore structure which does not permit the formation of harmful metal dendrites and effectively prevents a short circuit of the battery.

Depending on the production process, the particles of crosslinked polyvinylpyrrolidone (a) can be applied to or introduced into the base structure (c) homogeneously or else in different amounts. The particles (a) are preferably applied such that they are distributed homogeneously over the full area of the base structure (c). The advantages of such an arrangement are explained in more detail in WO 2009/033514, page 7 lines 4 to 12.

In a further embodiment of the present invention, in the inventive separator for an electrochemical cell, the particles of crosslinked polyvinylpyrrolidone (a) present in layer (A) are distributed homogeneously over the full area of the base structure (c).

The base structure (c) may also have a coating composed of the particles (a). A coating likewise advantageously brings about the suppression of short circuits in electrochemical cells. The interfacial region between coating and base structure (c) is inevitably at least partly filled with particles.

In a further embodiment of the present invention, in the inventive separator for an electrochemical cell, at least a portion of the filled regions is in the form of a coating of the base structure (c) with the particles of crosslinked polyvinylpyrrolidone (a).

In the present invention, preference is given to using a base structure (c) composed of nonwoven fabric, in which case the fibers from which the nonwoven fabric is produced are preferably produced from at least one organic polymer, especially an organic polymer selected from the group of polybutylene terephthalate, polyethylene terephthalate, polyacrylonitrile, polyvinylidene fluoride, polyetheretherketone, polyethylene naphthalate, polysulfone, polyimide, polyester, polypropylene, polyoxymethylene, polyamide and polyvinylpyrrolidone.

Preference is given especially to nonwoven fabrics whose fibers consist to an extent of more than 90% by weight, more preferably to an extent of more than 95% by weight and especially to an extent of more than 98% by weight of polyethylene terephthalate.

In a further embodiment of the present invention, in the inventive separator for an electrochemical cell, the base structure (c) is a nonwoven fabric whose fibers are produced from at least one organic polymer selected from the group of polybutylene terephthalate, polyethylene terephthalate, polyacrylonitrile, polyvinylidene fluoride, polyetheretherketone, polyethylene naphthalate, polysulfone, polyimide, polyester, polypropylene, polyoxymethylene, polyamide and polyvinylpyrrolidone. Particular preference is given to nonwoven fabrics composed of polyesters, such as polyethylene terephthalate or polybutylene terephthalate, especially polyethylene terephthalate.

The mean length of the fibers of the nonwoven fabric could be at least twice, preferably several times, the mean diameter thereof. This specific configuration allows manufacture of a particularly tear-resistant nonwoven fabric, since the fibers can be interlooped with one another.

At least 90% of the fibers of the nonwoven fabric could have a mean diameter of at most 12 μm. This specific configuration allows the construction of a ply with relatively low pore sizes of the first pores. An even finer porosity can be achieved by virtue of at least 40% of the fibers of the nonwoven fabric having a mean diameter of at most 8 μm.

Layer (A) and especially the separator overall preferably have a thickness of at most 100 μm. A layer or a separator of this thickness can be wound up without any problem and allows very reliable battery operation. The thickness could more preferably be at most 25 μm. A layer or separator with such a thickness allows the construction of very compact batteries or else capacitors. In further embodiments, the thickness is at least 3, 5 or 10 μm, more preferably between 5 and 100 or between 10 and 60 μm, especially in the range from 9 to 50 μm.

In a further embodiment of the present invention, in the inventive separator for an electrochemical cell, layer (A) has a mean thickness in the range from 9 to 50 μm.

The inventive separator, especially the separator comprising a base structure (c) composed of nonwoven fabric, could have a porosity of at least 25%. A separator of this porosity, due to its material density, particularly effectively suppresses the formation of short circuits. The separator could preferably have a porosity of at least 35%. A separator of this porosity allows production of a battery with high power density. The separator comprising nonwoven fabric described here has high porosity but exhibits very small second pores, such that no dendritic growths can form from one side to the other side of the separator. Against this background, it is conceivable that the second pores form a labyrinth-like structure in which no dendritic growths can form from one side to the other side of the separator. In a further embodiment, the porosity is between 25 and 70%, especially between 35 and 60%.

The inventive separator, especially the separator comprising a base structure (c) composed of nonwoven fabric, could have pore sizes of at most 3 μm. The selection of this pore size has been found to be particularly advantageous for prevention of short circuits. The pore sizes could more preferably be at most 1 μm. Such a separator particularly advantageously prevents short circuits as a result of metal dendrite growth, as a result of abrasion from electrode particles and as a result of direct contact of the electrodes on pressurization.

The inventive separator, especially the separator comprising a base structure (c) composed of nonwoven fabric, could exhibit a maximum tensile force in longitudinal direction of at least 15 newtons/5 cm. A separator of this strength can be wound in a particularly problem-free manner onto the electrodes of a battery without tearing.

The basis weight of the inventive separator could be between 10 and 60 and especially between 15 and 50 g/m$^2$.

A process for producing the inventive separator, especially the separator comprising a base structure (c) composed of nonwoven fabric, is described in more detail, for example, in WO 2009/033627 page 21 line 20 to page 23 line 12. In the case of the present invention, the otherwise unspecified particles (3) are replaced by particles of crosslinked polyvinylpyrrolidone (a), as described above, while the other components can be used as described. The coating and aftertreatment processes, especially the calendering process emphasized in WO 2009/033627, can be performed as described therein. Calendering can mechanically reinforce the inventive separator. Calendering brings about a reduction in surface roughness. The particles (a) present on the surface of the nonwoven fabric exhibit flattened spots after the calendering.

The inventive separator is particularly suitable for the construction of long-life electrochemical cells with high power density and energy density. Coupled with low thickness and low basis weight, it exhibits good mechanical properties and has a high porosity and good ion conductivity.

The above-described inventive separator for an electrochemical cell can be used in batteries, especially rechargeable batteries, or else in capacitors, in order to effectively prevent short circuits in particular therein.

The inventive separator can also find use in fuel cells as a gas diffusion layer or membrane, since it exhibits good wetting properties and can transport liquids.

The present invention therefore also further provides for the use of the above-described inventive separator as a separator in fuel cells, batteries or capacitors, or as a gas diffusion layer or as a membrane.

The present invention likewise also provides a fuel cell, a battery or a capacitor comprising at least one inventive separator, as described above.

Particular preference is given to an electrochemical cell comprising at least one inventive separator as described above and
(B) at least one cathode, and
(C) at least one anode.

The inventive electrochemical cell, especially a rechargeable electrochemical cell, is preferably one in which charge transport within the cell is accomplished principally by lithium cations.

With regard to suitable cathode materials, suitable anode materials, suitable electrolytes and possible arrangements, reference is made to the relevant prior art, for example to corresponding monographs and reference works: for example Wakihara et al. (editors): Lithium Ion Batteries, 1st edition, Wiley VCH, Weinheim, 1998; David Linden: Handbook of Batteries (McGraw-Hill Handbooks), 3rd edition, McGraw-Hill Professional, New York 2008; J. O. Besenhard: Handbook of Battery Materials, Wiley-VCH, 1998.

Useful cathodes (B) include especially those cathodes in which the cathode material comprises lithium-transition metal oxide, e.g. lithium cobalt oxide, lithium nickel oxide, lithium cobalt nickel oxide, lithium manganese oxide (spinel), lithium nickel cobalt aluminum oxide, lithium nickel cobalt manganese oxide or lithium vanadium oxide, or a lithium-transition metal phosphate such as lithium iron phosphate. If, however, the cathode materials intended for use are those which comprise polymers comprising sulfur or polysulfide bridges, it has to be ensured that the anode is charged with Li$^0$ before such an electrochemical cell can be discharged and charged again. The inventive separators are particularly suitable for those electrochemical cells in which the cathode (B) comprises at least one lithium ion-containing transition metal compound, for example the transition metal compounds LiCoO$_2$, LiFePO$_4$ or lithium-manganese spinel, which are known to the person skilled in the art of lithium ion battery technology.

The cathode (B) preferably comprises, as the lithium ion-containing transition metal compound, a lithium ion-containing transition metal oxide which comprises manganese as the transition metal.

Lithium ion-containing transition metal oxides which comprise manganese as the transition metal are understood in the context of the present invention to mean not only those oxides which have at least one transition metal in cationic form, but also those which have at least two transition metal oxides in cationic form. In addition, in the context of the present invention, the term "lithium ion-containing transition metal oxides" also comprises those compounds which—as well as lithium—comprise at least one non-transition metal in cationic form, for example aluminum or calcium.

In a preferred embodiment, manganese may occur in cathode (B) in the formal oxidation state of +4. Manganese in cathode (B) more preferably occurs in a formal oxidation state in the range from +3.5 to +4.

Many elements are ubiquitous. For example, sodium, potassium and chloride are detectable in certain very small proportions in virtually all inorganic materials. In the context of the present invention, proportions of less than 0.1% by weight of cations or anions are disregarded. A lithium ion-containing mixed transition metal oxide comprising less than 0.1% by weight of sodium is thus considered to be sodium-free in the context of the present invention. Correspondingly, a lithium ion-containing mixed transition metal oxide comprising less than 0.1% by weight of sulfate ions is considered to be sulfate-free in the context of the present invention.

In one embodiment of the present invention, lithium ion-containing transition metal oxide is a mixed transition metal oxide comprising not only manganese but at least one further transition metal.

In one embodiment of the present invention, lithium ion-containing transition metal compound is selected from manganese-containing lithium iron phosphates and preferably from manganese-containing spinels and manganese-containing transition metal oxides with layer structure, especially manganese-containing mixed transition metal oxides with layer structure.

In one embodiment of the present invention, lithium ion-containing transition metal compound is selected from those compounds having a superstoichiometric proportion of lithium.

In one embodiment of the present invention, manganese-containing spinels are selected from those of the general formula (I)

where the variables are each defined as follows:
$0.9 \leq a \leq 1.3$, preferably $0.95 \leq a \leq 1.15$,
$0 \leq b \leq 0.6$, for example 0.0 or 0.5,
where, in the case that $M^1$ selected =Ni, preferably:
$0.4 \leq b \leq 0.55$,
$-0.1 \leq d \leq 0.4$, preferably $0 \leq d \leq 0.1$.

$M^1$ is selected from one or more elements selected from Al, Mg, Ca, Na, B, Mo, W and transition metals of the first period of the Periodic Table of the Elements. $M^1$ is preferably selected from Ni, Co, Cr, Zn, Al, and $M^1$ is most preferably Ni.

In one embodiment of the present invention, manganese-containing spinels are selected from those of the formula $LiNi_{0.5}Mn_{1.5}O_{4-d}$ and $LiMn_2O_4$.

In another embodiment of the present invention, manganese-containing transition metal oxides with layer structure are selected from those of the formula (II)

$$Li_{1+t}M^2_{1-t}O_2 \qquad (II)$$

where the variables are each defined as follows:
$0 \leq t \leq 0.3$ and
$M^2$ is selected from Al, Mg, B, Mo, W, Na, Ca and transition metals of the first period of the Periodic Table of the Elements, the transition metal or at least one transition metal being manganese.

In one embodiment of the present invention, at least 30 mol % of $M^2$ is selected from manganese, preferably at least 35 mol %, based on the total content of $M^2$.

In one embodiment of the present invention, $M^2$ is selected from combinations of Ni, Co and Mn which do not comprise any further elements in significant amounts.

In another embodiment, $M^2$ is selected from combinations of Ni, Co and Mn which comprise at least one further element in significant amounts, for example in the range from 1 to 10 mol % of Al, Ca or Na.

In one embodiment of the present invention, manganese-containing transition metal oxides with layer structure are selected from those in which $M^2$ is selected from $Ni_{0.33}Co_{0.33}Mn_{0.33}$, $Ni_{0.5}Co_{0.2}Mn_{0.3}$, $Ni_{0.4}Co_{0.3}Mn_{0.4}$, $Ni_{0.4}Co_{0.2}Mn_{0.4}$ and $Ni_{0.45}Co_{0.10}Mn_{0.45}$.

In one embodiment, lithium-containing transition metal oxide is in the form of primary particles agglomerated to spherical secondary particles, the mean particle diameter (D50) of the primary particles being in the range from 50 nm to 2 μm and the mean particle diameter (D50) of the secondary particles being in the range from 2 μm to 50 μm.

Cathode (B) may comprise one or further constituents. For example, cathode (B) may comprise carbon in a conductive polymorph, for example selected from graphite, carbon black, carbon nanotubes, graphene or mixtures of at least two of the aforementioned substances.

In addition, cathode (B) may comprise one or more binders, for example one or more organic polymers. Suitable binders may be selected, for example, from those binders which are described in connection with the binder (b) for the inventive separator.

Particularly suitable binders for the cathode (B) are especially polyvinyl alcohol and halogenated (co)polymers, for example polyvinyl chloride or polyvinylidene chloride, especially fluorinated (co)polymers such as polyvinyl fluoride and especially polyvinylidene fluoride and polytetrafluoroethylene.

In addition, cathode (B) may have further constituents customary per se, for example an output conductor, which may be configured in the form of a metal wire, metal grid, metal mesh, expanded metal, metal sheet or metal foil. Suitable metal foils are especially aluminum foils.

In one embodiment of the present invention, cathode (B) has a thickness in the range from 25 to 200 μm, preferably from 30 to 100 μm, based on the thickness without output conductor.

The inventive electrochemical cell further comprises, as well as the inventive separator and the cathode (B), at least one anode (C).

In one embodiment of the present invention, anode (C) can be selected from anodes made from carbon, anodes comprising Sn or Si, and anodes comprising lithium titanate of the formula 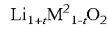$Ti_5O_{12}$ where x is a numerical value of >0 to 3. Anodes composed of carbon can be selected, for example, from hard carbon, soft carbon, graphene, graphite, and especially graphite, intercalated graphite and mixtures of two or more of the aforementioned carbons. Anodes comprising Sn or Si can be selected, for example, from nanoparticulate Si or Sn powder, Si or Sn fibers, carbon-Si or carbon-Sn composite materials, and Si-metal or Sn-metal alloys.

In a further embodiment of the present invention, in the inventive electrochemical cell, anode (C) is selected from anodes made from carbon, anodes comprising Sn or Si, and anodes comprising lithium titanate of the formula $Li_{4+x}Ti_5O_{12}$ where x is a numerical value of >0 to 3.

Anode (C) may comprise one or more binders. The binder selected may be one or more of the aforementioned binders (b) specified in the context of the description of the inventive separator.

In addition, anode (C) may have further constituents customary per se, for example an output conductor which may be configured in the form of a metal wire, metal grid, metal mesh, expanded metal, or a metal foil or metal sheet. Suitable metal foils are especially copper foils.

In one embodiment of the present invention, anode (C) has a thickness in the range from 15 to 200 μm, preferably from 30 to 100 μm, based on the thickness without output conductor.

Inventive electrochemical cells may also have constituents customary per se, for example conductive salt, nonaqueous solvent, and also cable connections and housing.

In one embodiment of the present invention, inventive electrochemical cells comprise at least one nonaqueous solvent which may be liquid or solid at room temperature and is preferably liquid at room temperature, and which is preferably selected from polymers, cyclic or noncyclic ethers, cyclic or noncyclic acetals, cyclic or noncyclic organic carbonates and ionic liquids.

Examples of suitable polymers are especially polyalkylene glycols, preferably poly-$C_1$-$C_4$-alkylene glycols and especially polyethylene glycols. Polyethylene glycols may comprise up to 20 mol % of one or more $C_1$-$C_4$-alkylene glycols in copolymerized form. Polyalkylene glycols are preferably doubly methyl- or ethyl-capped polyalkylene glycols.

The molecular weight $M_w$ of suitable polyalkylene glycols and especially of suitable polyethylene glycols may be at least 400 g/mol.

The molecular weight $M_w$ of suitable polyalkylene glycols and especially of suitable polyethylene glycols may be up to 5 000 000 g/mol, preferably up to 2 000 000 g/mol.

Examples of suitable noncyclic ethers are, for example, diisopropyl ether, di-n-butyl ether, 1,2-dimethoxyethane, 1,2-diethoxyethane, preference being given to 1,2-dimethoxyethane.

Examples of suitable cyclic ethers are tetrahydrofuran and 1,4-dioxane.

Examples of suitable noncyclic acetals are, for example, dimethoxymethane, diethoxymethane, 1,1-dimethoxyethane and 1,1-diethoxyethane.

Examples of suitable cyclic acetals are 1,3-dioxane and especially 1,3-dioxolane.

Examples of suitable noncyclic organic carbonates are dimethyl carbonate, ethyl methyl carbonate and diethyl carbonate.

Examples of suitable cyclic organic carbonates are compounds of the general formulae (X) and (XI)

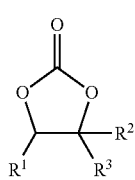

(X)

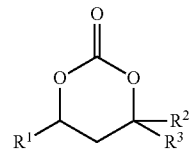

(XI)

in which $R^1$, $R^2$ and $R^3$ may be the same or different and are each selected from hydrogen and $C_1$-$C_4$-alkyl, for example methyl, ethyl, n-propyl, isopropyl, n-butyl, isobutyl, sec-butyl and tert-butyl, where $R^2$ and $R^3$ are preferably not both tert-butyl.

In particularly preferred embodiments, $R^1$ is methyl and $R^2$ and $R^3$ are each hydrogen, or $R^1$, $R^2$ and $R^3$ are each hydrogen.

Another preferred cyclic organic carbonate is vinylene carbonate, formula (XII).

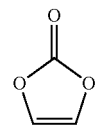

(XII)

Preference is given to using the solvent(s) in what is called the anhydrous state, i.e. with a water content in the range from 1 ppm to 0.1% by weight, determinable, for example, by Karl Fischer titration.

Inventive electrochemical cells further comprise at least one conductive salt. Suitable conductive salts are especially lithium salts. Examples of suitable lithium salts are $LiPF_6$, $LiBF_4$, $LiClO_4$, $LiAsF_6$, $LiCF_3SO_3$, $LiC(C_nF_{2n+1}SO_2)_3$, lithium imides such as $LiN(C_nF_{2n+1}SO_2)_2$, where n is an integer in the range from 1 to 20, $LiN(SO_2F)_2$, $Li_2SiF_6$, $LiSbF_6$, $LiAlCl_4$, and salts of the general formula $(C_nF_{2n+1}SO_2)_mXLi$, where m is defined as follows:

m=1 when X is selected from oxygen and sulfur,
m=2 when X is selected from nitrogen and phosphorus, and
m=3 when X is selected from carbon and silicon.

Preferred conductive salts are selected from $LiC(CF_3SO_2)_3$, $LiN(CF_3SO_2)_2$, $LiPF_6$, $LiBF_4$, $LiClO_4$, and particular preference is given to $LiPF_6$ and $LiN(CF_3SO_2)_2$.

Inventive electrochemical cells further comprise a housing which may be of any shape, for example cuboidal or in the shape of a cylinder. In another embodiment, inventive electrochemical cells have the shape of a prism. In one variant, the housing used is a metal-plastic composite film processed as a pouch.

Inventive electrochemical cells give a high voltage of up to approx. 4.8 V and are notable for high energy density and good stability. More particularly, inventive electrochemical cells are notable for only a very small loss of capacity in the course of repeated cycling.

The present invention further provides for the use of inventive electrochemical cells in lithium ion batteries. The present invention further provides lithium ion batteries comprising at least one inventive electrochemical cell. Inventive electrochemical cells can be combined with one another in inventive lithium ion batteries, for example in series connection or in parallel connection. Series connection is preferred.

The present invention further provides for the use of inventive electrochemical cells as described above in motor vehicles, bicycles operated by electric motor, aircraft, ships or stationary energy stores.

The present invention therefore also further provides for the use of inventive lithium ion batteries in devices, especially in mobile devices. Examples of mobile devices are vehicles, for example automobiles, bicycles, aircraft, or water vehicles such as boats or ships. Other examples of mobile devices are those which are portable, for example computers, especially laptops, telephones or electrical power tools, for example from the construction sector, especially drills, battery-driven screwdrivers or battery-driven tackers.

The use of inventive lithium ion batteries comprising inventive separators in devices offers the advantage of a longer run time before recharging, a smaller loss of capacity over the course of a prolonged run time, and reduced risk of self-discharge and destruction of the cell caused by a short circuit. If the intention were to achieve an equal run time with electrochemical cells with lower energy density, a higher weight for electrochemical cells would have to be accepted.

The invention is explained by the examples which follow, but these do not limit the invention. Figures in % are each based on % by weight, unless explicitly stated otherwise.

Test Methods:

In the working examples, the following test methods were used:

The particle size distribution was determined by means of laser diffraction technology in powder form with a Mastersizer from Malvern Instruments GmbH, Herrenberg, Germany.

The mean pore size was determined to ASTM E 1294 (Standard Test Method for Pore Size Characteristics of Membrane Filters Using Automated Liquid Porosimeter).

For the determination of the basis weight, 3 samples each of size 100×100 mm were punched out, the samples were weighed and the measured value was multiplied by 100.

The thicknesses were measured with a 2000 U/Elektrik precision thickness gauge. The measurement area was 2 cm$^2$, the measurement pressure 1000 cN/cm$^2$.

The porosity was calculated from the thickness, the weight and the densities of the materials used.

For the determination of shrinkage, specimens of size 100×100 mm were punched out and stored in a Mathis Labdryer at 160° C. for 10 minutes. Thereafter, the shrinkage of the specimens was determined.

The through-plane air permeance of the battery separators was determined by the Gurley method (ISO 5636/5).

I. Production of Crosslinked Polyvinylpyrrolidone Particles

Crosslinked and micronized polyvinylpyrrolidone particles (Kollidon® CL-M from BASF SE) were sifted with an AFG wind sifter having a deflector wheel to particle sizes of less than 5 μm (×10=1.23 μm, ×50=2.57 μm, ×90=4.94 μm).

II. Production of Separators

II.1 Production of an Inventive Separator (S.1)

To 180 parts of a 30% aqueous dispersion of the crosslinked PVP particles (D 90=4.94 μm) from example I. were added 70 parts of a 0.5% aqueous solution of polyvinylpyrrolidone (Luvitec K90 from BASF SE), and the mixture was stirred for 30 minutes. Thereafter, likewise while stirring, 5 parts of a 50% styrene-butadiene rubber dispersion (average particle size: 190 nm; glass transition temperature: −10° C.) were added. The dispersion was stirred for 2 hours and tested for stability for at least 24 hours. The viscosity of the resulting dispersion was 70 cP and it had a pH of 7.4.

Coating

A nonwoven PET fabric of width 15 cm (thickness: 20 μm, basis weight: 10.6 g/m$^2$) was coated continuously with the above dispersion by means of a roller coating process and dried at 120° C. An impregnated nonwoven fabric (S.1) with a basis weight of 18.6 g/m$^2$ and a thickness of 31 μm was obtained. Gurley number: 26 sec/50 ml air.

S.1 exhibited the following shrinkage properties:
1 h at 160° C.: 1.32%

II.2 Production of a Noninventive Separator (C-S.2)

To 200 parts of a 60% PTFE dispersion (Dyneon TF 5032R, from 3M, mean particle size 160 nm) were added, while stirring constantly, 50 parts of a 1% CMC (carboxymethylcellulose) solution. Thereafter, 13.3 parts of a 50% SBR (styrene-butadiene rubber) dispersion and 50 parts of deionized water were added, likewise while stirring. The dispersion was stirred for 2 hours and tested for stability for at least 24 hours. The viscosity of the resulting dispersion was 200 cP with a pH of 9.5.

Coating

A nonwoven PET fabric (thickness: 19 μm, basis weight: 11 g/m$^2$) was coated continuously with the above dispersion by means of a roller coating process, suspended with free movement and dried with infrared radiators.

An impregnated nonwoven fabric with a basis weight of 59 g/m$^2$ and a thickness of 42 μm was obtained. The calculated porosity was 35%.

II.3 Production of a Noninventive Separator (C-S.3)

To 322 parts of a 1% CMC (carboxymethylcellulose) solution were added 1470 parts of a 65% aluminum oxide dispersion ($Al_2O_3$) (mean particle size 0.59 μm), and the mixture was stirred for 30 minutes. Thereafter, 100 parts of a 50% NBR dispersion (mean particle size 0.2 μm) were added, likewise while stirring. The dispersion was stirred for 2 hours and tested for stability for at least 24 hours. The viscosity of the resulting dispersion was 110 cP and it had a pH of 9.6.

Coating

A nonwoven PET fabric of width 15 cm (thickness: 19 μm, basis weight: 11 g/m$^2$) was coated continuously with the above dispersion by means of a roller coating process and dried at 120° C. An impregnated nonwoven fabric with a basis weight of 32.6 g/m$^2$ and a thickness of 29 μm was obtained. The mean pore size was 0.22 μm and the calculated porosity 60%.

Comparison of the specific conductivities of inventive separators with noninventive separators. The specific conductivity L is calculated by:

$L=(d/A*R)$ where R is the resistance of a single ply in [Ω], d is the total thickness of the membrane in [cm] and A is the electrode area in [cm$^2$].

| Separator | Spec. conductivity [mS/cm] | | |
|---|---|---|---|
| | 1 ply | 3 plies | 5 plies |
| S.1 | 0.0004253 | 0.000435 | 0.000445 |
| C-S.2 | 0.000049 | 0.000049 | 0.000043 |
| C-S.3 | 0.000060 | 0.000064 | 0.000063 |

Compilation of further properties of inventive separators with noninventive separators

| | Separator | | |
|---|---|---|---|
| | S.1 | C-S.2 | C-S.3 |
| Thickness/[μm] | 31 | 42 | 29 |
| Basis weight/[g/m$^2$] | 19 | 59 | 33 |

-continued

|  | Separator | | |
| --- | --- | --- | --- |
|  | S.1 | C-S.2 | C-S.3 |
| Mean pore size/[µm] | 0.2 | 0.4 | 0.2 |
| Max. pore size/[µm] | — | — | — |
| Theor. porosity/[%] | 45 | approx. 35 | approx. 60 |
| Gurley/[s/50 cm³] | 26 | 165 | 380 |
| Maximum tensile force/[N/5 cm] | 30 | 36 | 38 |
| Shrinkage at 160° C., 1 h/[%] | 1.3 | 2 | <1 |
| Abrasion | no | no | no |
| Nail puncture test/[N] | 720 | 540 | 730 |

III. Testing of the Separators in Electrochemical Cells

For the electrochemical characterization of the separators S.1 and C-S.2 produced in example II., electrochemical cells were constructed, called single layer pouch cells. Pouch cells are electrochemical cells which are known to those skilled in the art. These each comprise a combination of positive and negative electrode, separated by a separator soaked with electrolyte, said combination having been laminated with a metal-polymer composite film. For this purpose, as well as the separators produced in II., cathodes of dimensions 5×5 cm and anodes of dimensions 5.6×5.6 cm consisting of the following components were used in each case:

Anode: graphite-based anode on copper foil conductor (capacity 1.7 mAh/cm²).
  To produce the electrodes, a suspension of 91% by weight of graphite powder, 6% by weight of PVDF binder and 3% by weight of conductive black in M-ethylpyrrolidone was first produced and blended by means of a planetary mixer. The suspension was applied to the copper backing foil with a Labcoater (from Erichsen) and then dried at 120° C. under reduced pressure overnight.

Cathode: nickel cobalt aluminate cathode on aluminum conductor (capacity 1.4 mAh/cm², $LiNi_{0.80}Co_{0.15}Al_{0.05}O_2$).
  To produce the electrodes, a suspension of 88% by weight of $LiNi_{0.80}Co_{0.15}Al_{0.05}O_2$ powder, 6% by weight of PVDF binder, 3% by weight of conductive black and 3% by weight of graphite in N-ethylpyrrolidone was first produced and blended by means of a planetary mixer. The suspension was applied to the aluminum backing foil with a Labcoater (from Erichsen) and then dried at 120° C. under reduced pressure overnight.

Electrolyte: 1 M $LiPF_6$ dissolved in ethylene carbonate and ethyl methyl carbonate in a mass ratio of 1:1

The inventive separator S.1 was used to produce the inventive electrochemical cell EC.1, and the comparative separator C-S.2 to produce the electrochemical comparative cell C-EC.2.

The inventive electrochemical cell EC.1 featured, in comparison to the electrochemical comparative cell C-EC.2, a higher capacity of 177 mAh/g compared to 159 mAh/g at 0.5 C (table 1). In addition, the cell resistance of C-EC.2 was higher by a factor of at least 1.4 compared to the cell resistance of EC.1. Moreover, the inventive cell EC.1 had much better C rate stability (table 1). At a load of 2 C, the capacity of C-EC.2 fell to 9 mAh/g, compared to 141 mAh/g for EC.1. At 4 C, EC.1 still exhibited 95 mAh/g, while C-EC.2 no longer delivered any current at all.

TABLE 1

| C rate stability of EC.1 and C-EC.2 | | | | |
| --- | --- | --- | --- | --- |
|  | Capacity | | | |
|  | 0.5 C | 1.0 C | 2.0 C | 4.0 C |
| EC.1 | 177 mAh/g | 159 mAh/g | 141 mAh/g | 95 mAh/g |
| C-EC.2 | 159 mAh/g | 124 mAh/g | 9 mAh/g | — |

The invention claimed is:

1. A separator for an electrochemical cell comprising
   (A) at least one layer comprising
      (a) crosslinked polyvinylpyrrolidone in the form of particles,
      (b) at least one binder, and
      (c) optionally a base structure,
   where the mass ratio of the crosslinked polyvinylpyrrolidone in the form of particles (a) to the sum of the mass of at least one binder (b) in the layer (A) has a value in the range from 99.9:0.1 to 50:50.

2. The separator according to claim 1, wherein the crosslinked polyvinylpyrrolidone present in layer (A) in the form of particles (a) has a mean particle size in the range from 0.1 to 5 µm.

3. The separator according to claim 1, wherein the particles of crosslinked polyvinylpyrrolidone (a) present in layer (A) have an irregular shape.

4. The separator according to claim 1, wherein the binder (b) present in layer (A) is selected from the group of polymers consisting of polyvinyl alcohol, water-soluble polyvinylpyrrolidone, styrene-butadiene rubber, polyacrylonitrile, carboxymethylcellulose and fluorinated (co)polymers.

5. The separator according to claim 1, wherein layer (A) further comprises a base structure (c) composed of nonwoven fabric.

6. The separator according to claim 1, wherein the base structure (c) consists of fibers and has first pores formed by the fibers, the base structure (c) being filled at least partly with particles of crosslinked polyvinylpyrrolidone (a) and the particles of crosslinked polyvinylpyrrolidone (a) at least partly filling the first pores and forming regions filled with particles of crosslinked polyvinylpyrrolidone (a), the particles of crosslinked polyvinylpyrrolidone (a) forming second pores in the filled regions, the mean diameter of the particles of crosslinked polyvinylpyrrolidone (a) being greater than the mean pore size of the majority of second pores.

7. The separator according to claim 6, wherein at least a portion of the filled regions is in the form of a coating of the base structure (c) with the particles of crosslinked polyvinylpyrrolidone (a).

8. The separator according to claim 1, wherein the particles of crosslinked polyvinylpyrrolidone (a) present in layer (A) are distributed homogeneously over the full area of the base structure (c).

9. The separator according to claim 1, wherein the base structure (c) is a nonwoven fabric whose fibers are produced from at least one organic polymer selected from the group of polybutylene terephthalate, polyethylene terephthalate, polyacrylonitrile, polyvinylidene fluoride, polyetheretherketone, polyethylene naphthalate, polysulfone, polyimide, polyester, polypropylene, polyoxymethylene, polyamide and polyvinylpyrrolidone.

10. The separator according to claim 1, wherein layer (A) has a mean thickness in the range from 9 to 50 µm.

11. A fuel cell, battery or capacitor comprising at least one separator according to claim 1.

12. An electrochemical cell comprising at least one separator according to claim 1 and
(B) at least one cathode, and
(C) at least one anode.

13. The electrochemical cell according to claim 12, wherein anode (C) is selected from the group consisting of anodes made from carbon, anodes comprising Sn or Si, and anodes comprising lithium titanate of the formula $Li_{4+x}Ti_5O_{12}$ where x is a numerical value of >0 to 3.

14. A lithium ion battery comprising at least one electrochemical cell according to claim 12.

15. The separator according to claim 1, wherein the binder (b) is an uncrosslinked polymer.

16. The separator according to claim 1, wherein the crosslinked polyvinylpyrrolidone particles are present in the layer (A) in an amount of from 95% by weight to 99.9% by weight of the total weight of the layer.

17. The separator according to claim 1, wherein the layer comprises 1% by weight or less of particles of an organic polymer other than the crosslinked polyvinylpyrrolidone particles and less than 1% by weight of inorganic particles.

* * * * *